United States Patent [19]

Lawrence

[11] 4,257,566

[45] Mar. 24, 1981

[54] CUTTERHEAD FOR FORAGE HARVESTERS AND THE LIKE

[75] Inventor: Allan K. Lawrence, Ottumwa, Iowa

[73] Assignee: Deere & Company, Moline, Ill.

[21] Appl. No.: 56,385

[22] Filed: Jul. 10, 1979

[51] Int. Cl.³ .............................................. B02C 18/18
[52] U.S. Cl. ..................................... 241/221; 241/294
[58] Field of Search ................. 241/221, 222, 242, 294

[56] References Cited

U.S. PATENT DOCUMENTS

| 2,398,932 | 4/1946 | Grant | 241/222 X |
| 3,378,053 | 4/1968 | Potzsch | 241/221 X |
| 4,061,284 | 12/1977 | Raisbeck et al. | 241/294 |

FOREIGN PATENT DOCUMENTS

| 93543 | 5/1962 | Denmark | 241/222 |
| 377124 | 7/1973 | U.S.S.R. | 241/222 |

Primary Examiner—Howard N. Goldberg

[57] ABSTRACT

A forage harvester cutterhead of the type having a rotatable member carrying circumferentially spaced cutting knives. Each knife is beat such that a leading cutting portion is directed radially inwardly of its trailing portion and ahead of its knife support so as to provide better cutting power efficiency and more clearance for its mounting means. The bent knife configuration allows a thinner knife edge to be used and provides improved quality and uniformity in cut crop material. The thinner knife cuts through mat of material with less force and less disturbance to uncut material resulting in fewer long particles pulled from mat and much fewer long cob particles. Corn cobs are not dislodged from mat due to lower cutting force and hence are sliced up neatly.

6 Claims, 6 Drawing Figures

FIG. 4
PRIOR ART
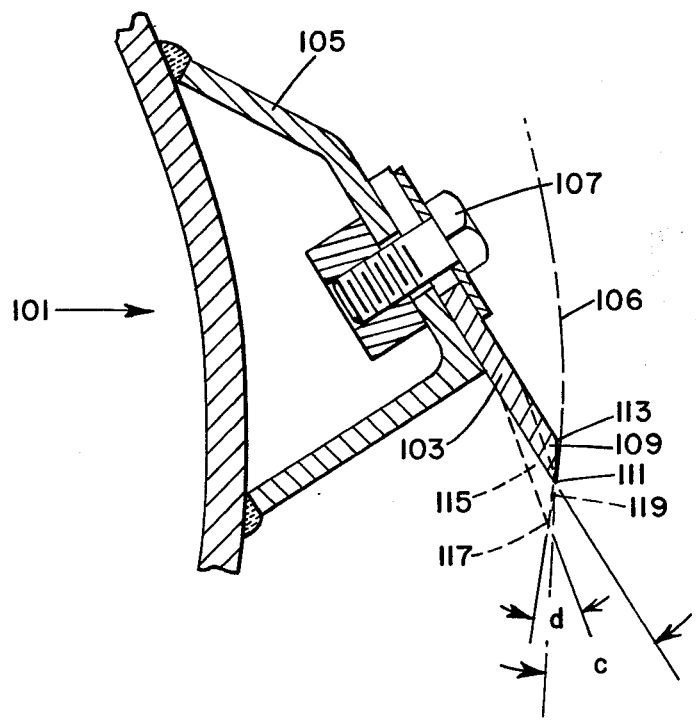
FIG. 5
FIG. 5a
PRIOR ART
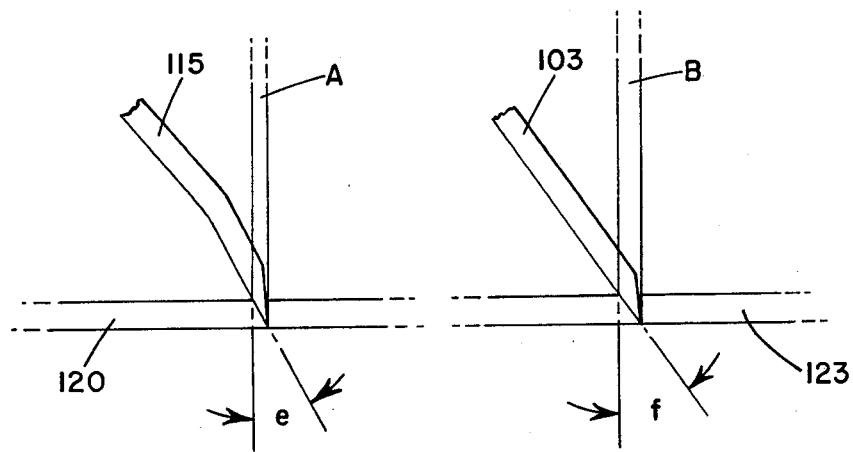

CUTTERHEAD FOR FORAGE HARVESTERS AND THE LIKE

BACKGROUND OF THE INVENTION

Those versed in the art will recognize a forage harvester or the like as an agricultural machine that harvests field-borne crops and feeds such crops to a rotary cutterhead for reduction into small fragments and for ultimate delivery to a trailing wagon or other receptacle. A typical cutterhead will include a cylindrical member having at its outer surface a plurality of knife supports extending lengthwise of the surface as respects the axis of rotation, and each knife support will carry a cutter knife having a flat portion resting on and affixed to its support and a leading portion extending forwardly of the support, the leading portion being ground to a leading cutting edge which cooperates with a fixed, transverse cutter bar or knife so that crops fed to the cutterhead are reduced as the knives successively pass the fixed knife during high speed rotation of the cutterhead.

The knives are conventionally mounted on their respective supports by bolts or cap screws so that the knives may be readily adjusted relative to the fixed knife and also so that the knives may be removed, in some instances, for sharpening or replacement. The bolt heads project radially outwardly, requiring that the support and knife assemblies be so designed that the bolt heads do not strike the fixed knife and further so that the bolt heads do not suffer premature wear from constant contact with in-fed crops.

A problem which has been incurred in the use of forage harvesters with such cutterheads is non-uniformity of cut. For example, the optimum particle size for crop material chopped with a commercially available forage harvester using a cutterhead as shown in U.S. Pat. No. 4,061,284 is between 0.25 and 0.5 inches. It has been found that crop material pieces up to 3 inches in size are passed through the machine. This problem is particularly acute in corn silage where pieces of corncob and husks are found up to such lengths. Pieces of such lengths are undesirable for two reasons. One is that in most instances the such pieces are not eaten by cattle and thus are wasted. The second reason is that when the processed crop material is ensiled, the longer pieces tend to bridge across other pieces and form air pockets. The formation of air pockets in the ensilage causes oxidation of the crop material and, thus, deterioration of its food value for cattle.

OBJECTS AND SUMMARY OF THE INVENTION

Accordingly, it is an object of this invention to provide an improved cutterhead providing improved uniformity of cut of crop material.

Another object of this invention is to provide a cutterhead with a thinner and sharper knife edge, i.e., the angle formed at the cutting edge between the outer, radially ground bevel and the inner knife surface is reduced relative to the prior art.

Another object of this invention is to provide an improved cutterhead with knives requiring less power for cutting due to a smaller force being required to slice through the mat of crop material.

Another object of this invention is to provide an improved cutterhead with knives that are stronger and more easily sharpened.

These and other objects of the invention which will be apparent from a combination of the following detailed description in conjunction with the accompanying claims are accomplished by providing a cutterhead with knives having a flat mounting portion and leading cutting portion which are angularly related at a bend line so that the cutting edge lies radially inwardly of a coplanar extension of its associated flat portion. The bend affords additional strength and enables the use of knife material of less than usual thickness. A thinner knife is easier to grind. The design also affords more bolt head clearance with respect to the stationary knife against which cutterhead knives cut crop material. Further, more efficient shallow cutting is possible with a knife of this type. Still further, knives having different bends can be used with the same knife supports.

DESCRIPTION OF THE DRAWINGS

FIG. 4 is a fragmentary cross-sectional view of a prior art straight knife cutterhead with a bent knife of a cutterhead in accordance with this invention superimposed over a straight knife.

FIGS. 5 and 5a illustrate schematically the severing action on crop material of the bent knife of FIG. 4 and the prior art cutterhead knife respectively.

DESCRIPTION OF THE PREFERRED EMBODIMENT

Figure 1:
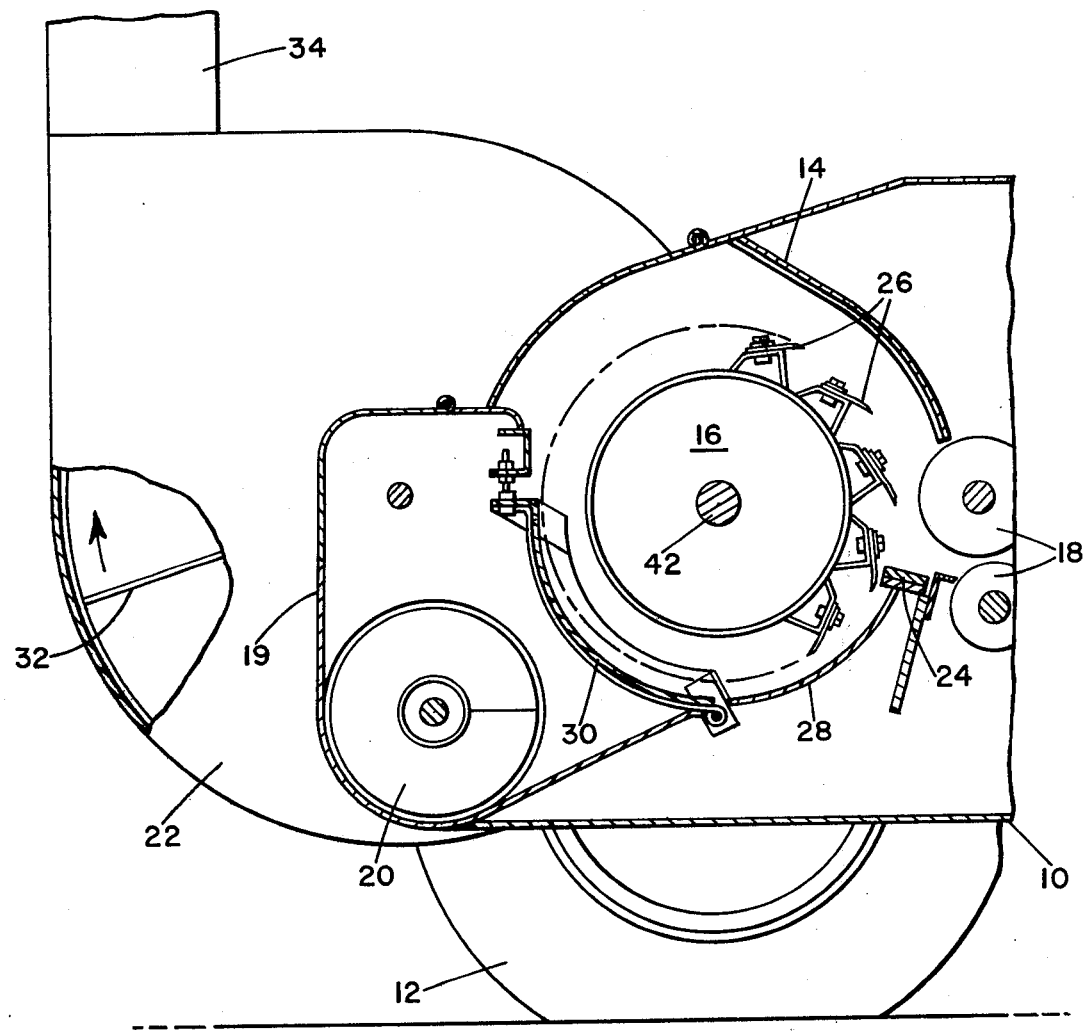
FIG. 1 is a longitudinal sectional view of the rear portion of a representative forage harvester, showing the improved cutterhead.

The invention may be embodied in a forage harvester of the same general type as that shown in U.S. Pat. No. 3,377,785, the disclosure of which is hereby incorporated by reference herein. Referring to FIG. 1, a main frame 10 is carried on a pair of wheels 12 (only one being shown) and includes a cutterhead housing 14 containing a cutterhead 16, feedrolls 18 for feeding material into cutterhead housing 14, an auger trough 19 containing a cross auger 20 for moving crop material laterally (i.e., parallel to the cutterhead axis of rotation) of the machine and into a blower housing 22. Just rearwardly of the feed rolls 18 is a transverse fixed or stationary knife or cutter bar 24 which cooperates with a plurality of cutter knives 26 on the cutterhead, whereby material fed rearwardly by the feed rolls and across the fixed knife is reduced or cut into relatively short lengths during rotation of the cutterhead in a clockwise direction. The reduced material is swept rearwardly across an arcuate closed bottom 28, is passed through openings in a screen 30 to the auger 20 and then is delivered laterally to the blower housing 22. This housing contains a blower fan 32 which, rotating in a clockwise direction, delivers reduced crops upwardly through a discharge spout 34. Typically, but not shown here, a trailing wagon or the like receives the delivered crops.

Figure 2:
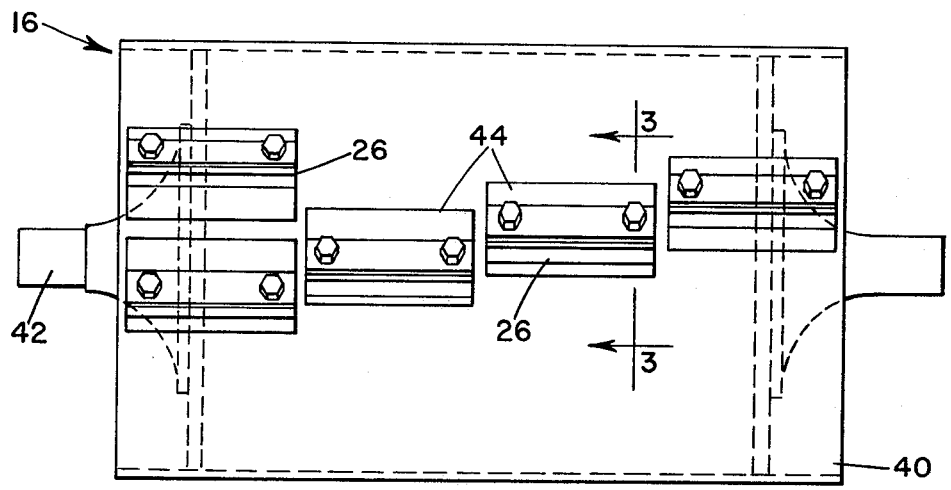
FIG. 2 is an enlarged plan view of the cutterhead, showing, however, only one row of knives.
Figure 3:
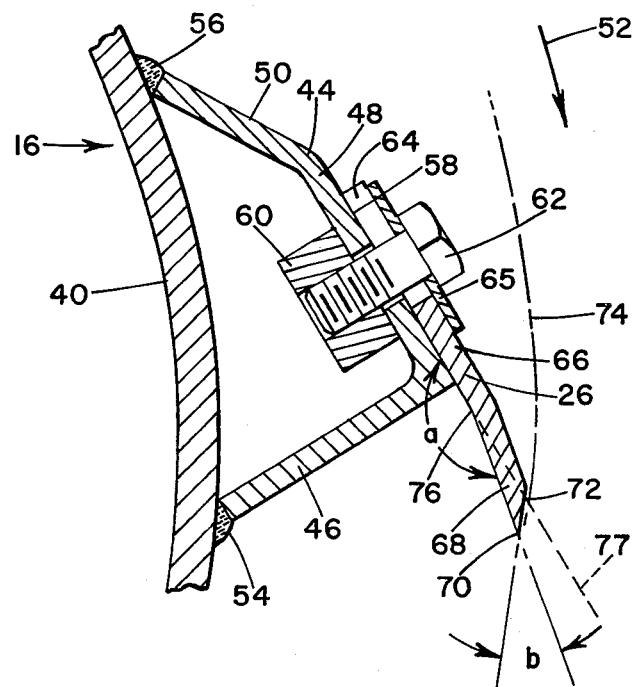
FIG. 3 is a still further enlarged section on the line 3—3 of FIG. 2.

In FIGS. 2 and 3, the cutterhead is here shown as being of the drum type, having a cylindrical wall 40 concentric with a cutterhead shaft 42. The cutterhead carries a plurality of circumferentially spaced apart knife supports 44. These supports are of the type shown in U.S. Pat. No. 4,061,284 (the disclosure of which is hereby incorporated by reference herein), being relatively short and arranged in staggered relation (FIG. 2), each being disposed lengthwise as respects the axis of the cutterhead. As shown in FIG. 3, each support has integral, angularly related legs 46 and 48, and the latter leg has a trailing, integral extension 50. The leg 46 leads the remainder of the support with respect to the direction of rotation of the cutterhead, designated by the arrow 52 in FIG. 3. The leg 46 and leg extension 50 are preferably welded to the cylindrical wall 40 as shown at 54 and 56.

Each knife support has a flat mounting surface 58 spaced radially outwardly of the cylindrical wall 40, which surface is closer to the wall at its trailing portion than it is at its leading portion, thus sloping outwardly in the leading direction. At its underside each support has a bar 60 with multiple internally threaded holes spaced apart lengthwise of the support. These threaded holes receive a pair of bolts or cap screws 62 for mounting the associated knife 26, each knife being formed with a corresponding pair of slots 64 to provide for adjustment of the knife so as to obtain proper cutting relationship to the fixed knife 24. A clamp plate 65 is disposed between bolts 62 and each knife 26 to strengthen the clamping action on each knife 26 and to prevent knife movement during bolt tightening while maintaining proper knife adjustment. Each cutting knife has a flat portion 66 and an integral forward extension or leading portion 68, the flat portion resting on the knife support mounting surface 58 and the leading portion forwardly overhanging the knife support. The leading portion is ground to a cutting edge 70, being ground from the outside so that the bevel 72 lies generally on an imaginary circle indicated at 74. The center of this circle is the axis of the cutterhead. It will be noted that the outer portion of the bolts 62 lie inwardly of this circle so as to clear the fixed knife.

As distinguished from the prior art, the present knife, rather than being straight, is bent along a bend line 76 that runs lengthwise of the knife such that the leading portion 68 lies radially inwardly of a coplanar extension 77 (here represented (FIG. 3) as a line lying in the plane of the inner surface) of flat portion 66. The bend is preferably such that an angle "a" between the inner surfaces of the flat and leading portions is in the order of 165° to 178°, preferably 168°. The bevel 72 forms an angle "b" with the under or inner face of the leading portion, which angle is in the order of between 25° and 35°, preferably about 30° for a machine of the type disclosed here; that is, one in which the cut crops are conveyed to a blower housing. For a machine of the type in which the cutterhead functions also as a "thrower", it will be found that an angle of about 45° will perform satisfactorily.

It will be understood that all knife supports and knives are alike and it is deemed sufficient to have described only one assembly in detail.

Reference is now made to FIG. 4 to further illustrate the features of applicant's invention relative to a prior art cutterhead in accordance with U.S. Pat. No. 4,061,284. FIG. 4 shows a section, similar to FIG. 3, of a prior art cutterhead 101. Cutterhead 101 comprises a knife 103 fixed to support 105 via bolts 107 (only one being shown). Knife 103 has a leading portion 109 which is ground from the outside to form a cutting edge 111 and a bevel 113 which lie generally on an imaginary cylinder indicated by arc 106. The edge angle "c" of knife 103 is here shown as 35° degrees and is generally known to be between 35° and 45° degrees.

Also illustrated in FIG. 4 in dotted lines is a bent knife 115 in accordance with the features of this invention. Bent knife 115 has a leading portion with a cutting edge 117 and a bevel 119 ground from the outside so that edge 117 and bevel 119 lie on arc 106 and form an edge angle "d" of about 30°. Knife 115 is positioned with its flat portion (not shown) aligned with straight knife 103 to show the differences in the orientation and shape of the knife edges relative to arc 106 caused by the bend in knife 115. It can be appreciated that by the provision of a bend in knife 116, bevel 119 circumtends a larger segment of arc 106 to form a sharper, thinner knife and smaller edge angle compared to prior art knife 103.

To further illustrate additional features of applicant's invention compared to the prior art knife disclosed in U.S. Pat. No. 4,061,284, reference is now made to FIGS. 5 and 5a. FIG. 5 illustrates schematically the angle of incidence "e" of the bent knife 115 (as in FIG. 4) with respect to crop material 120 in accordance with features of this invention. FIG. 5a illustrates schematically the angle of incidence "f" of the prior art knife 103 (as in FIG. 4) with respect to a crop material sample 123. It can be seen that with a thinner knife edge impacting crop material 120 at an angle of incidence "e", the area of impact "A" of the knife 115 on material 120 is smaller for knife 115 than area of impact "B" of prior art knife 103 on material 123. In order for the knives 103, 115 to sever mats 120, 123, the mats are compressed in the volumes adjacent to the areas of impact A and B, respectively. Thus, a cutterhead in accordance with the features of this invention requires less power. This is due to a smaller force being required to slice through crop material because less force is expended in compressing the crop mat when the mat is being severed.

It has also been discovered that a bent knife in accordance with the features of this invention yields a more uniform length of cut. It is believed that this may be explained because there may be reduced pulling action of the knife on crop stems and less dragging of the stems out of the uncut mat of the crop material by a thin knife edge impacting the crop material at a smaller angle of incidence. This is particularly significant when the crop material is corn silage. As mentioned above, it had been found that long pieces of corncobs and husks were left in the crop material after passing through the prior art harvesting machines. It is believed that the cobs are pulled out of the mat by excess compressive forces of the wider prior art knives. The thinner knife edges of this invention minimize the undesirable compressing action and cut more cleanly through the cob and husks without pulling portions of the cob and husk from the uncut crop mat and results in a more uniform cutting of all crop material into small pieces.

I claim:

1. A forage harvester comprising:
cutterhead housing having an arcuate closed bottom,
a stationary knife fixed to said bottom,
a rotary cutterhead rotatably mounted about a fixed axis and with respect to said housing, said cutterhead comprising:
  a cylindrical wall having a diameter much greater than the distance from the cylindrical wall to the arcuate bottom,
  a plurality of knife supports, each support having a front and rear leg relative to the direction of rotation of the cutterhead, said rear leg having a flat mounting surface spaced outwardly from said cylindrical wall, said rear leg having fastener openings through said surface, a plurality of knives respectively parallel to and carried on said mounting surface, each knife having fastener openings formed therein, said knives generating a cylinder when said cutterhead is rotated, each knife having (1) an integral flat portion resting on its respective mounting surface and (2) an integral leading portion extending forwardly, relative to the direction of cutterhead rotation, from said flat portion and overhanging its respective mounting surface, said leading portion terminating in a cutting edge, said flat portion and leading portion of each knife meeting at a bend line parallel to and forward of the respective mounting surface, said edge lying radially inwardly of a coplanar extension of the lower surface of said flat portion, a plurality of fasteners inserted through each said knife and each said mounting surface, said fasteners projecting outwardly from said knife and spaced slightly inwardly of said shear bar when said cutterhead is rotated and each said knife passes said bar.

2. A cutterhead according to claim 1, further characterized in that each cutting edge is formed as a radially outward bevel lying at an angle in the order of 25° to 35° to the plane of the lower surface of said leading portion.

3. A cutterhead according to claim 2, further characterized in that said angle is substantially 30°.

4. A cutterhead according to claim 1, further characterized in that the flat and leading portions of each knife are related at the bend line at an angle in the order of 165° to 178° measured at the radially underside of the knife.

5. A cutterhead according to claim 4, further characterized in that said angle is substantially 168°.

6. A cutterhead according to claims 2-5 or 1 wherein each cutting edge has a radially outward bevel lying generally along a cylinder circumscribed by the tip of the cutting edge when the cutterhead is rotated about said axis.

* * * * *